United States Patent
Jiang et al.

(10) Patent No.: US 11,810,331 B2
(45) Date of Patent: Nov. 7, 2023

(54) NEURAL IMAGE COMPRESSION WITH LATENT FEATURE-DOMAIN INTRA-PREDICTION

(71) Applicant: TENCENT AMERICA LLC, Palo Alto, CA (US)

(72) Inventors: Wei Jiang, Sunnyvale, CA (US); Wei Wang, Palo Alto, CA (US); Ding Ding, Palo Alto, CA (US); Shan Liu, San Jose, CA (US); Xiaozhong Xu, State College, PA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 317 days.

(21) Appl. No.: 17/462,287

(22) Filed: Aug. 31, 2021

(65) Prior Publication Data
US 2022/0215592 A1    Jul. 7, 2022

Related U.S. Application Data

(60) Provisional application No. 63/133,704, filed on Jan. 4, 2021.

(51) Int. Cl.
*G06T 9/00* (2006.01)
*H04N 19/124* (2014.01)
(Continued)

(52) U.S. Cl.
CPC ............. *G06T 9/002* (2013.01); *G06N 3/045* (2023.01); *H04N 19/124* (2014.11);
(Continued)

(58) Field of Classification Search
None
See application file for complete search history.

(56) References Cited

U.S. PATENT DOCUMENTS 11,238,650 B2 *  2/2022  Li ............................. G06T 7/74
11,677,948 B2 *  6/2023  Besenbruch ........... G06N 3/084
                                                  375/240.03

(Continued)

FOREIGN PATENT DOCUMENTS

WO    2020/174216 A1    9/2020

OTHER PUBLICATIONS

Choi et al., "Near-Lossless Deep Feature Compression for Collaborative Intelligence", 2018 IEEE 20th International Workshop on Multimedia Signal Processing (MMSP), IEEE, Aug. 29, 2018, pp. 1-6 (Year: 2018) (provided by applicant).*

(Continued)

*Primary Examiner* — Anand P Bhatnagar
(74) *Attorney, Agent, or Firm* — Sughrue Mion, PLLC

(57) ABSTRACT

A method of decoding an image with latent feature-domain intra-prediction is performed by at least one processor and includes receiving a set of latent blocks and for each of the blocks in the set of latent blocks: predicting a block, based on a set of previously recovered blocks; receiving a selection signal indicating a currently recovered block, based on the selection signal performing one of (1) and (2): (1) generating a compact residual, a set of residual context parameters, a decoded residual, and generating a first decoded block; (2) generating a second decoded block, based on a compact representation block and a set of context parameters. The method further includes generating a set of recovered blocks comprising each of the currently recovered blocks; generating a recovered latent image by merging all the blocks in the set of recovered blocks; and decoding the recovered latent image, to obtain a reconstructed image.

20 Claims, 7 Drawing Sheets

(51) Int. Cl.
  *H04N 19/159* (2014.01)
  *H04N 19/176* (2014.01)
  *H04N 19/13* (2014.01)
  *G06N 3/045* (2023.01)

(52) U.S. Cl.
  CPC ........... *H04N 19/13* (2014.11); *H04N 19/159* (2014.11); *H04N 19/176* (2014.11)

(56) References Cited

U.S. PATENT DOCUMENTS

| | | | | |
|---|---|---|---|---|
| 11,705,226 B2* | 7/2023 | Colley | ................... | G16H 20/10 705/3 |
| 2014/0177721 A1* | 6/2014 | Onno | ................... | H04N 19/139 375/240.16 |
| 2020/0137384 A1* | 4/2020 | Kwong | ................... | H04N 19/11 |
| 2021/0287430 A1* | 9/2021 | Li | ................... | G06V 10/776 |
| 2022/0084204 A1* | 3/2022 | Li | ................... | G06N 3/08 |
| 2022/0279183 A1* | 9/2022 | Besenbruch | ................... | G06N 3/045 |
| 2023/0154055 A1* | 5/2023 | Besenbruch | ................... | G06V 10/774 375/240.03 |

OTHER PUBLICATIONS

International Search Report dated Dec. 7, 2021 in Application No. PCT/US2021/049212.
Written Opinion of the International Searching Authority dated Dec. 7, 2021 in Application No. PCT/US2021/049212.
Choi et al., "Near-Lossless Deep Feature Compression for Collaborative Intelligence", 2018 IEEE 20th International Workshop on Multimedia Signal Processing (MMSP), IEEE, Aug. 29, 2018, pp. 1-6 (6 pages total).
Extended European Search Report dated Mar. 2, 2023 from the European Patent Office in EP Application No. 21916117.1.
Communication dated Mar. 21, 2023 from the European Patent Office in EP Application No. 21916117.1.

* cited by examiner

NEURAL IMAGE COMPRESSION WITH LATENT FEATURE-DOMAIN INTRA-PREDICTION

CROSS-REFERENCE TO RELATED APPLICATION

This application is based on and claims priority to U.S. Provisional Patent Application No. 63/133,704, filed on Jan. 4, 2021, the disclosure of which is incorporated by reference herein in its entirety.

BACKGROUND

Standard groups and companies have been actively searching for potential needs for standardization of future video coding technology. These standard groups and companies have established JPEG-AI groups focusing on AI-based end-to-end neural image compression using Deep Neural Networks (DNNs). The success of recent approaches has brought more and more industrial interests in advanced neural image and video compression methodologies.

Given an input image x, the target of NIC uses the image x as the input to a DNN encoder to compute a compressed representation $\bar{y}$ that is compact for storage and transmission, then use $\bar{y}$ as the input to a DNN decoder to reconstruct an image $\bar{x}$. Previous NIC methods take a variational auto-encoder (VAE) structure, where the DNN encoders directly use the entire image x as its input, which is passed through a set of network layers that work like a black box to compute the output representation $\bar{y}$. Correspondingly, the DNN decoders take the entire representation $\bar{y}$ as its input, which is passed through another set of network layers that work like another black box to compute the reconstructed $\bar{x}$.

The block-based intra-prediction and residual coding mechanism encodes residuals between prediction blocks and the original blocks instead of directly encoding the original whole image. This mechanism has been proven highly effective for compressing image frames in modern video coding standards like HEVC and VVC. Entire images are partitioned into blocks of various sizes, and a prediction block is generated by copying the boundary pixels of previous compressed blocks along a variety of angular directions, and then the residuals between the original block and the prediction block are compressed. Residuals can more efficiently be encoded compared to the original pixels and, therefore, better coding performance can be achieved.

SUMMARY

According to embodiments, a method of neural image compression using an intra-prediction mechanism in the latent feature domain is performed by at least one processor and includes receiving a set of latent blocks, and for each of the blocks in the set of latent blocks: predicting a block, based on a set of previously recovered blocks, using a first neural network; receiving a selection signal indicating a currently recovered block; based on the received selection signal, performing one of (1) and (2): (1) generating a compact residual, a set of residual context parameters, and a decoded residual, and a first decoded block, based on the predicted block and the decoded residual; (2) generating a second decoded block, based on a compact representation block and a set of context parameters. The method further includes generating a set of recovered blocks comprising each of the currently recovered blocks; generating a recovered latent image by merging all the blocks in the set of recovered blocks; and decoding the generated recovered latent image, using a second neural network, to obtain a reconstructed image.

According to embodiments, an apparatus of neural image compression using an intra-prediction mechanism in the latent feature domain includes at least one memory configured to store program code, and at least one processor configured to read the program code and operate as instructed by the program code, the program code including receiving code configured to cause the at least one processor to receive a set of latent blocks, prediction code configured to cause the at least one processor to predict a block, based on a set of previously recovered blocks, using a second neural network, selecting code configured to cause the at least one processor to receive a selection signal indicating a currently recovered block for each of the blocks in the set of latent blocks, based on the received selection signal, perform one of (1) and (2): first generating code configured to cause the at least one processor to generate a compact residual, second generating code configured to cause the at least one processor to generate a set of residual context parameters, third generating code configured to cause the at least one processor to generate a decoded residual, and first decoding code configured to cause the at least one processor to generate a first decoded block, based on the predicted block and the decoded residual; (2) second decoding code configured to cause the at least one processor to generate a second decoded block, based on a compact representation block and a set of context parameters. The program further includes recovered block generating code configured to cause the at least one processor to generate a set of recovered blocks comprising each of the currently recovered blocks, merging code configured to cause the at least one processor to merge all the blocks in the set of recovered blocks to generate a recovered latent image, and third decoding code configured to cause the at least one processor to decode the generated recovered latent image, using a second neural network, to obtain a reconstructed image.

According to embodiments, a non-transitory computer-readable medium storing instructions that, when executed by at least one processor, receive a set of latent blocks, predict a block, based on a set of previously recovered blocks, using a second neural network, receive a selection signal indicating a currently recovered block for each of the blocks in the set of latent blocks, based on the received selection signal, perform one of (1) and (2): (1) generate a compact residual, a set of residual context parameters, and a decoded residual, and generate a first decoded block based on the predicted block and the decoded residual; (2) a second decoded block, based on a compact representation block and a set of context parameters. The non-transitory computer-readable medium further including instructions that, when executed by at least one processor, generate a set of recovered blocks comprising each of the currently recovered blocks; merge all the blocks in the set of recovered blocks to generate a recovered latent image; and decode the generated recovered latent image, using a second neural network, to obtain a reconstructed image.

DETAILED DESCRIPTION

Figure 1:
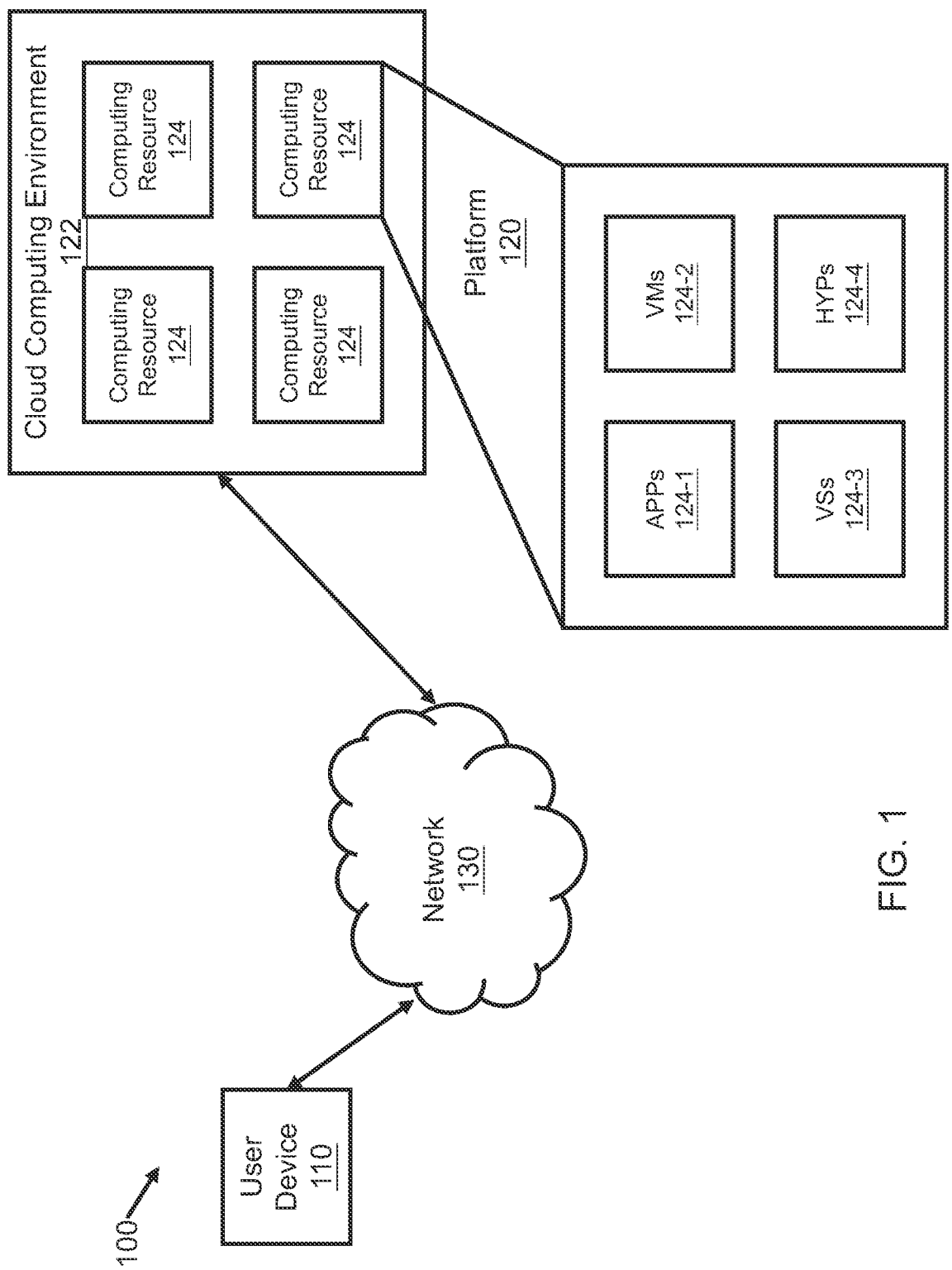
FIG. 1 is a diagram of an environment in which methods, apparatuses and systems described herein may be implemented, according to embodiments.

Embodiments relate to a Neural Image Compression (NIC) framework of compressing an input image by a Deep Neural Network (DNN) using the block-based intra-prediction mechanism in the latent feature representation. Example embodiments of the present invention will be described below with reference to the drawings. In the drawings, the same modules are denoted by the same reference numbers, and thus a repeated description may be omitted as needed. FIG. 1 is a diagram of an environment 100 in which methods, apparatuses and systems described herein may be implemented, according to embodiments.

As shown in FIG. 1, the environment 100 may include a user device 110, a platform 120, and a network 130. Devices of the environment 100 may interconnect via wired connections, wireless connections, or a combination of wired and wireless connections.

The user device 110 includes one or more devices capable of receiving, generating, storing, processing, and/or providing information associated with platform 120. For example, the user device 110 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, the user device 110 may receive information from and/or transmit information to the platform 120.

The platform 120 includes one or more devices as described elsewhere herein. In some implementations, the platform 120 may include a cloud server or a group of cloud servers. In some implementations, the platform 120 may be designed to be modular such that software components may be swapped in or out. As such, the platform 120 may be easily and/or quickly reconfigured for different uses.

In some implementations, as shown, the platform 120 may be hosted in a cloud computing environment 122. Notably, while implementations described herein describe the platform 120 as being hosted in the cloud computing environment 122, in some implementations, the platform 120 may not be cloud-based (i.e., may be implemented outside of a cloud computing environment) or may be partially cloud-based.

The cloud computing environment 122 includes an environment that hosts the platform 120. The cloud computing environment 122 may provide computation, software, data access, storage, etc. services that do not require end-user (e.g., the user device 110) knowledge of a physical location and configuration of system(s) and/or device(s) that hosts the platform 120. As shown, the cloud computing environment 122 may include a group of computing resources 124 (referred to collectively as "computing resources 124" and individually as "computing resource 124").

The computing resource 124 includes one or more personal computers, workstation computers, server devices, or other types of computation and/or communication devices. In some implementations, the computing resource 124 may host the platform 120. The cloud resources may include compute instances executing in the computing resource 124, storage devices provided in the computing resource 124, data transfer devices provided by the computing resource 124, etc. In some implementations, the computing resource 124 may communicate with other computing resources 124 via wired connections, wireless connections, or a combination of wired and wireless connections.

As further shown in FIG. 1, the computing resource 124 includes a group of cloud resources, such as one or more applications ("APPs") 124-1, one or more virtual machines ("VMs") 124-2, virtualized storage ("VSs") 124-3, one or more hypervisors ("HYPs") 124-4, or the like.

The application 124-1 includes one or more software applications that may be provided to or accessed by the user device 110 and/or the platform 120. The application 124-1 may eliminate a need to install and execute the software applications on the user device 110. For example, the application 124-1 may include software associated with the platform 120 and/or any other software capable of being provided via the cloud computing environment 122. In some implementations, one application 124-1 may send/receive information to/from one or more other applications 124-1, via the virtual machine 124-2.

The virtual machine 124-2 includes a software implementation of a machine (e.g., a computer) that executes programs like a physical machine. The virtual machine 124-2 may be either a system virtual machine or a process virtual machine, depending upon use and degree of correspondence to any real machine by the virtual machine 124-2. A system virtual machine may provide a complete system platform that supports execution of a complete operating system ("OS"). A process virtual machine may execute a single program, and may support a single process. In some implementations, the virtual machine 124-2 may execute on behalf of a user (e.g., the user device 110), and may manage infrastructure of the cloud computing environment 122, such as data management, synchronization, or long-duration data transfers.

The virtualized storage 124-3 includes one or more storage systems and/or one or more devices that use virtualization techniques within the storage systems or devices of the computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 124-4 may provide hardware virtualization techniques that allow multiple operating systems (e.g., "guest operating systems") to execute concurrently on a host computer, such as the computing resource 124. The hypervisor 124-4 may present a virtual operating platform to the guest operating systems, and may manage the execution of the guest operating systems. Multiple instances of a variety of operating systems may share virtualized hardware resources.

The network 130 includes one or more wired and/or wireless networks. For example, the network 130 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of the environment 100 may perform one or more functions described as being performed by another set of devices of the environment 100.

Figure 2:
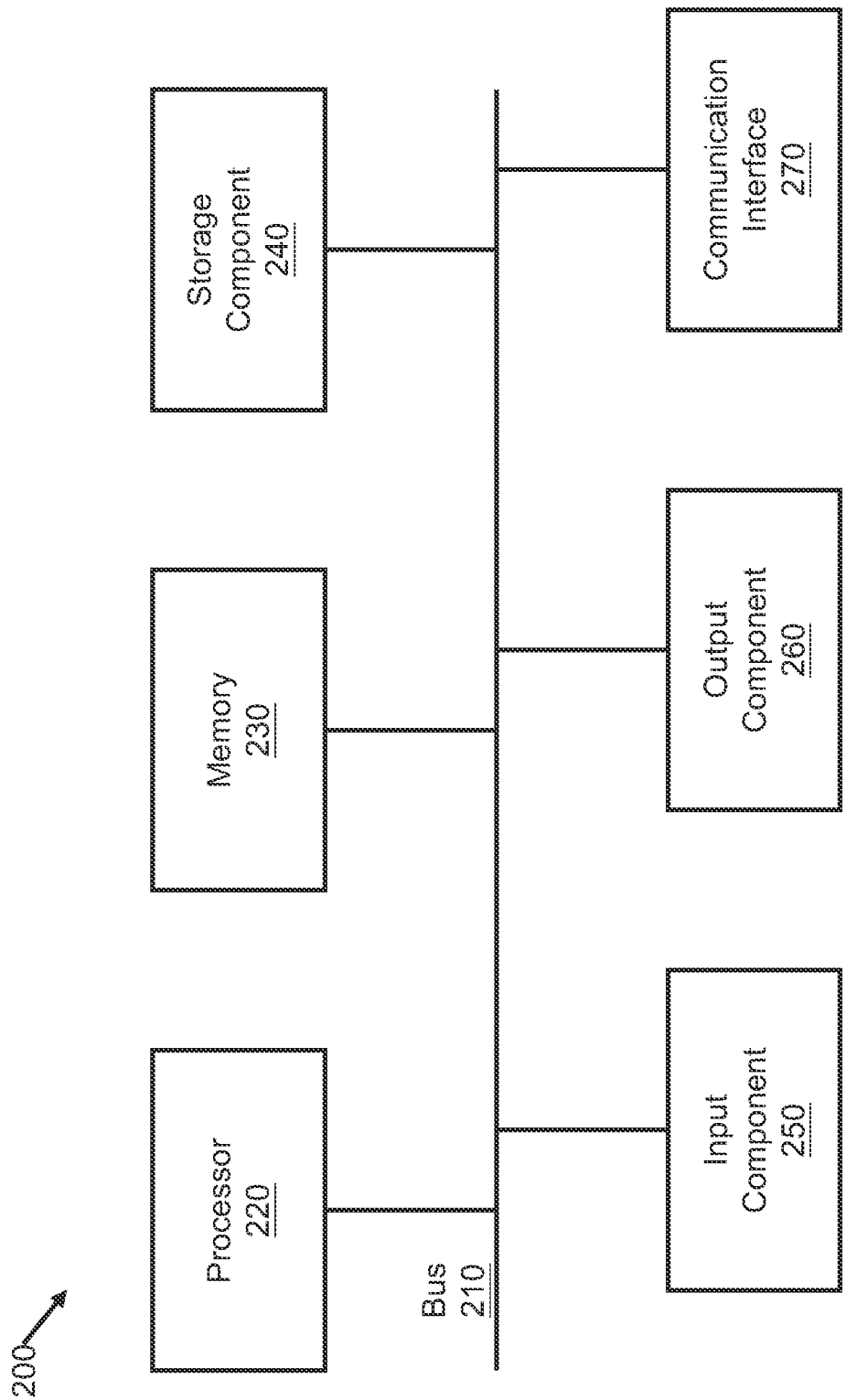
FIG. 2 is a block diagram of example components of one or more devices of FIG. 1.

FIG. 2 is a block diagram of example components of one or more devices of FIG. 1.

A device 200 may correspond to the user device 110 and/or the platform 120. As shown in FIG. 2, the device 200 may include a bus 210, a processor 220, a memory 230, a storage component 240, an input component 250, an output component 260, and a communication interface 270.

The bus 210 includes a component that permits communication among the components of the device 200. The processor 220 is implemented in hardware, firmware, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 220 includes one or more processors capable of being programmed to perform a function. The memory 230 includes a random access memory (RAM), a read only memory (ROM), and/or another type of dynamic or static storage device (e.g., a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g., a touch screen display, a keyboard, a keypad, a mouse, a button, a switch, and/or a microphone). Additionally, or alternatively, the input component 250 may include a sensor for sensing information (e.g., a global positioning system (GPS) component, an accelerometer, a gyroscope, and/or an actuator). The output component 260 includes a component that provides output information from the device 200 (e.g., a display, a speaker, and/or one or more light-emitting diodes (LEDs)).

The communication interface 270 includes a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes in response to the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or the storage component 240 may cause the processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, the device 200 may include additional components, fewer components, different components, or differently arranged components than those shown in FIG. 2. Additionally, or alternatively, a set of components (e.g., one or more components) of the device 200 may perform one or more functions described as being performed by another set of components of the device 200.

Methods and apparatuses for NIC by latent feature-domain block-based intra-prediction and residual coding will now be described in detail.

Embodiments may relate to a latent feature-domain block-based intra-prediction and residual coding framework for NIC. Two mechanisms to improve the NIC coding efficiency are used: encoding residuals between prediction blocks and the original blocks instead of encoding the original blocks, and performing intra-prediction in the latent feature domain.

Figure 3:
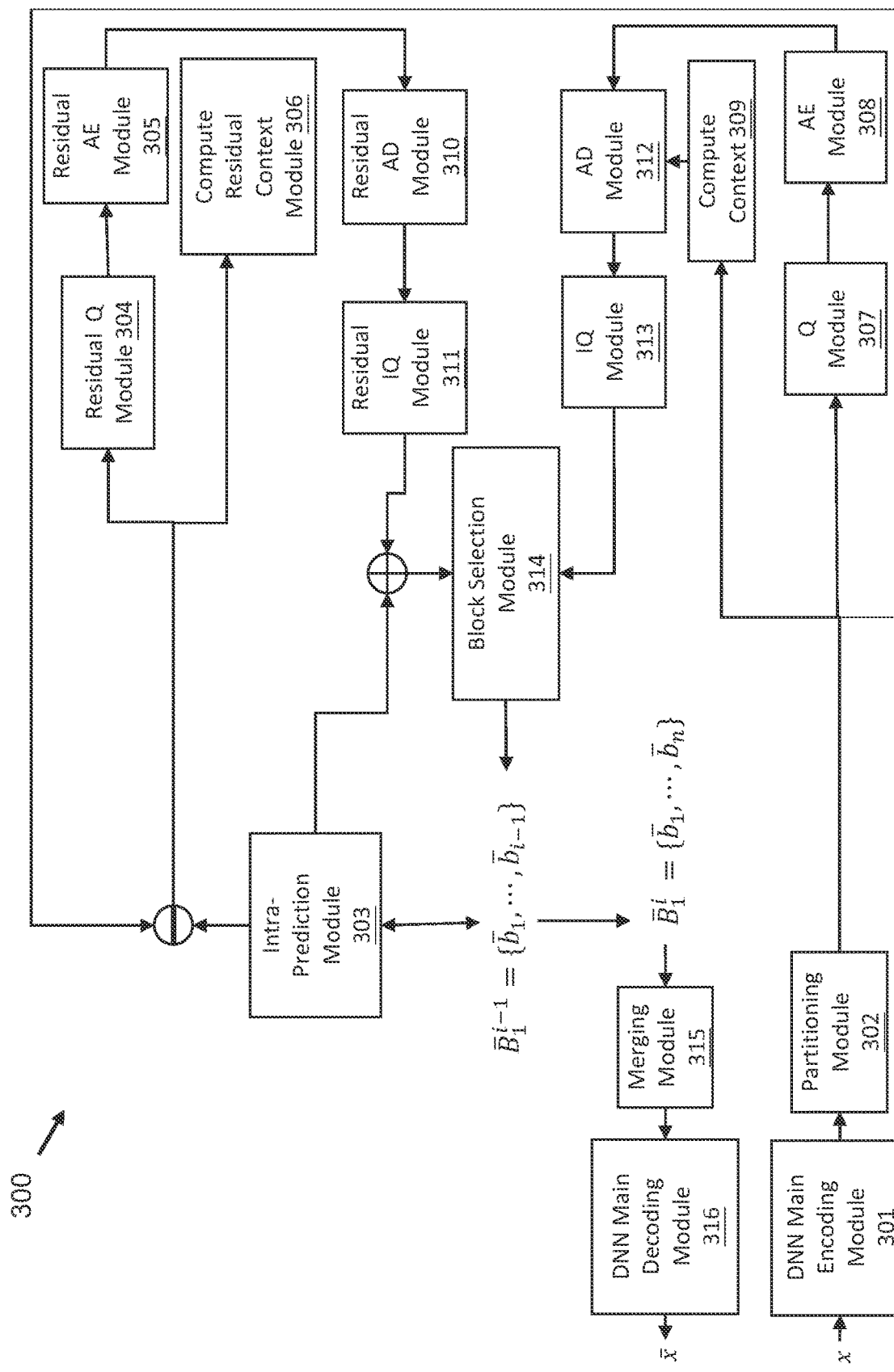
FIG. 3 is a block diagram of a test NIC Encoder and NIC Decoder apparatus for neural image compression with intra-prediction in the latent feature-domain, during a test stage, according to embodiments.

FIG. 3 is a block diagram of a test NIC Encoder and NIC Decoder apparatus 300 for neural image compression with intra-prediction in the latent feature-domain, during a test stage, according to embodiments.

As shown in FIG. 3, the test apparatus 300 includes a DNN Main Encoding module 301, a Partitioning module 302, an Intra-Prediction module 303, a Residual Q module 304, a Residual AE module 305, a Compute Residual Context module 306, a Q module 307, a AE module 308, a Compute Context module 309, a Residual AD module 310, a Residual IQ module 311, an AD module 312, a IQ module 313, a Block Selection module 314, a Merging module 315, and a DNN Main Decoding module 316.

Given an input image x of size (h, w, c), where h, w, c are the height, width, and number of channels, respectively, DNN Main Encoding module 301 computes a latent representation y by using a DNN Main Encoder. The latent representation y is a 3D tensor of size (h, w, c), and y is passed through a Partitioning module 302 and partitioned into n blocks $B_1^n=\{b_1, \ldots b_n\}$, each partitioned latent block $b_i$ having size $(k_h, k_w, k_c)$. Let $\overline{B}_1^{i-1}=\{\overline{b}_1, \ldots, \overline{b}_{i-1}\}$ denote a set of previously recovered blocks, $\overline{B}_1^{i-1}$ is passed through an Intra-Prediction module 303 to compute a predicted block $\hat{b}_i$, by using a Prediction DNN. A prediction residual $\hat{r}_i$ can be computed based on the difference between the predicted block $\hat{b}_i$ and the partitioned latent block $b_i$. The prediction residual $\hat{r}_i$ is passed through a Residual Q module 304 and quantized using a quantization method. This is followed by a Residual AE module 305 to generate, using an arithmetic encoding method, an entropy encoded compact residual representation $r_i'$. At the same time, a Compute Residual Context module 306 computes a set of residual context parameters $z_r$, based on the prediction residual $\hat{r}_i$, by using a Residual Context DNN.

On the other hand, the partitioned latent block $b_i$ of the latent representation y can be passed through a Q module 307 followed by an AE module 308 to generate a quantized (by the Q module 307 with a quantization method) and then entropy encoded (by the AE module 308 with an arithmetic encoding method) compact representation $b_i'$. At the same time, a Compute Context module 309 computes a set of context parameters $z_b$, based on the partitioned latent block $b_i$, by using a Context DNN.

Using the compact residual representation $r_i'$ and the residual context parameters $z_r$, a Residual AD module 310 (using an arithmetic decoding method) followed by a Residual IQ 311 module (using a dequantization method) compute a decoded residual $\overline{r}_i$. The decoded residual $\overline{r}_i$ can be added back to the predicted block $\hat{b}_i$ to obtain a decoded block $\overline{b}_{ri}$. Using the compact representation $b_i'$ and the context parameters $z_b$, an AD module 312 (using an arithmetic decoding method) followed by an IQ module 313 (using a dequantization method) compute a decoded block $\overline{b}_{bi}$. A Block Selection module 314 generates a selection signal $s_i$ indicating which decoded block, $\overline{b}_{ri}$ or $\overline{b}_{bi}$, is used as the current recovered block $\overline{b}_i$. This is done, for example, by setting the selection signal $s_i$ as binary 0 or 1. A process for generating a section signal $s_i$ will be described later. When decoded block $\overline{b}_{ri}$ is used, the selection signal $s_i$, together with the compact residual representation $r_i'$ and the residual context parameters $z_r$, are sent to the decoder side. When decoded block $\overline{b}_{bi}$ is used, the selection signal $s_i$, together with the compact representation $b_i'$ and the context parameters $z_b$, are sent to the decoder side. Then the current recovered block $\overline{b}_i$ is used to update the set of previously recovered blocks $\overline{B}_1^{i-1}$ into a set of currently recovered blocks $\overline{B}_1^i=\{\overline{b}_1, \ldots, \overline{b}_n\}$, and the encoder continues to process the next block $b_{i+1}$.

After all the n blocks are recovered, a Merging module 315 generates a recovered latent representation $\overline{y}$ by combining all the recovered blocks. Then, a DNN Main Decoding module 316 computes a reconstructed image $\overline{x}$ based on the recovered latent representation $\overline{y}$ by using an DNN Main Decoder.

Figure 4:
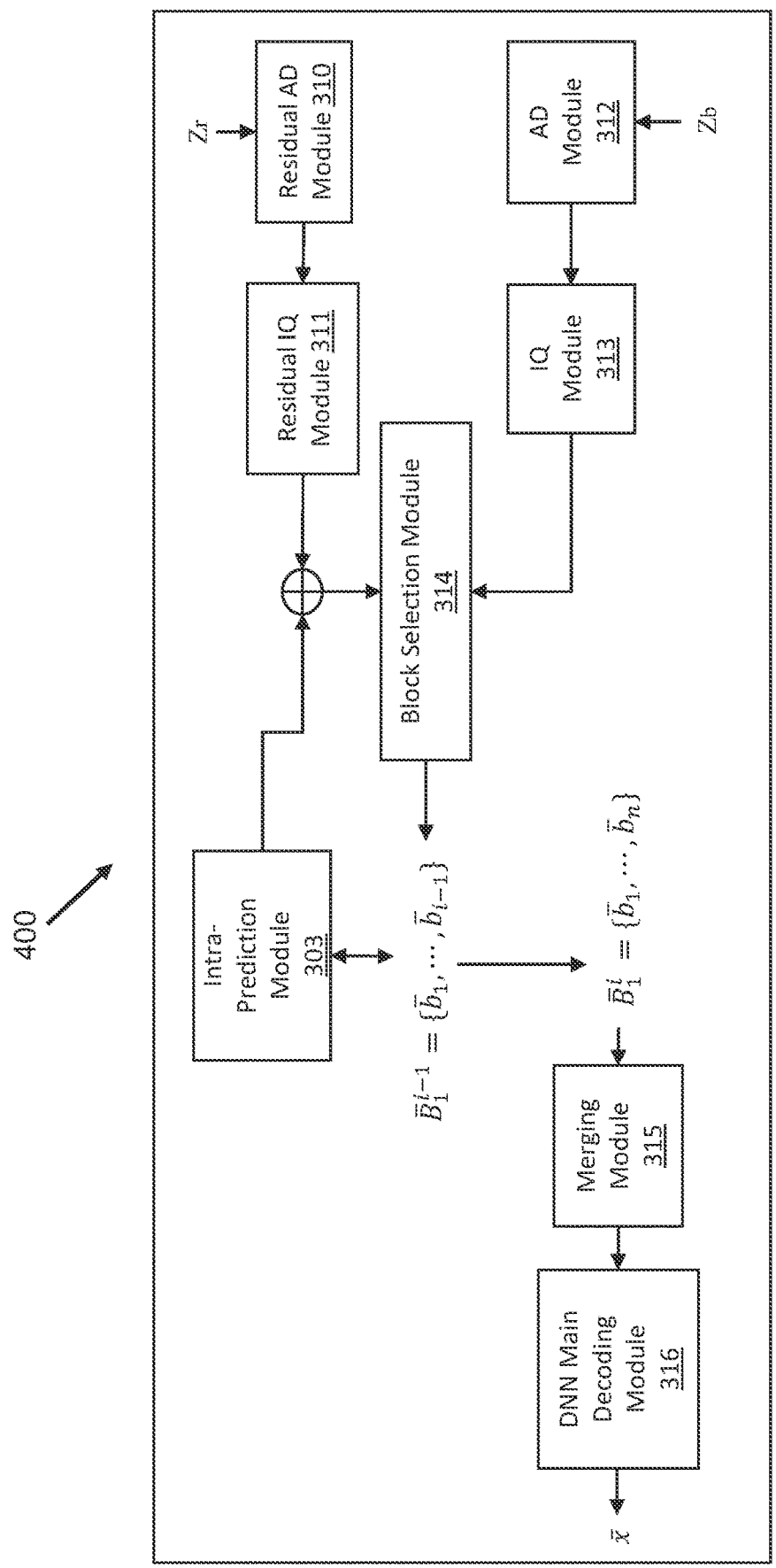
FIG. 4 is a block diagram of the decoder side of the test NIC Encoder and NIC Decoder apparatus of FIG. 3, during a test stage, according to embodiments.

FIG. 4 is a block diagram of, specifically, the decoder side of the NIC Encoder and NIC Decoder apparatus 300 described in FIG. 3, during a test stage, according to embodiments.

As shown in FIG. 4, the decoder side includes the Intra-Prediction module 303, the Residual AD module 310, the Residual IQ module 311, the AD module 312, the IQ module 313, the Merging module 315, and the DNN Main Decoding module 316.

On the decoder side, as described in FIG. 4, after receiving the block selection signal $s_i$, the system selects one of the following methods to compute the recovered block $\overline{b}_i$. If the selection signal $s_i$ indicates that the recovered block $\overline{b}_i$ comes from the decoded block based on the compact residual representation $r_i'$ and the residual context parameters $z_r$, the Residual AD module 310 followed by the Residual IQ module 311 are used to compute the decoded residual $\overline{r}_i$. At the same time, based on the set of previously recovered blocks $\overline{B}_1^{i-1}=\{\overline{b}_1, \ldots, \overline{b}_{i-1}\}$, the Intra-Prediction module 303 computes the predicted block $\hat{b}_i$ by using the Prediction DNN. The decoded residual $\overline{r}_i$ is added back to the predicted block $\hat{b}_i$ to obtain the recovered block $\overline{b}_i$. If the selection signal $s_i$ indicates that the recovered block $\overline{b}_i$ comes from the decoded block based on the compact representation $b_i'$ and the context parameters $z_b$, the AD module 312 followed by the IQ module 313 are used to compute the recovered block $\overline{b}_i$. Then the recovered block $\overline{b}b_i$ is used to update the set of previously recovered blocks $\overline{B}_1^{i-1}$ into the set of currently recovered blocks $\overline{B}_1^i$, and the decoder continues to decode the next recovered block $\overline{b}_{i+1}$.

After all the blocks are recovered, the Merging module 315 generates the recovered latent representation $\overline{y}$ by combining all the recovered blocks. Then the DNN Main Decoding module 316 computes the reconstructed image $\overline{x}$ based on the recovered latent representation $\overline{y}$ by using the DNN Main Decoder.

In the preferred embodiment, the DNN Main Encoder and the DNN Main Decoder take the VAE structure. This disclosure does not put any restrictions on the specific network structures for the DNN Main Encoder and DNN Main Decoder.

The latent representation y can be partitioned in different ways. For example, y is a 3D tensor of size (h, w, c), where h, w, c are the height, width and channels of the latent representation. It can be partitioned into $(h, w, k_c)$ blocks (i.e., $k_h=h$, $k_w=w$) along the channel axis, into $(k_h, k_w, c)$ blocks (i.e. $k_c=c$) in the height and width dimensions, into $(k_h, k_w)$ blocks within the height and width dimension for each channel, or into a general $(k_h, k_w, k_c)$ block.

The partitioned blocks can be processed in various orders according to a pre-determined scanning order or adaptively determined order by some scanning methods. For example, from top-down along the height axis, from left to right along the width axis, or from shallow to deep along the channel axis. Once the scanning order is determined, the Prediction DNN uses the set of previously recovered blocks $\overline{B}_1^{i-1}=\{\overline{b}_1, \ldots, \overline{b}_{i-1}\}$ to compute the current predicted block $\hat{b}_i$ according to the order. The Prediction DNN can have different network architectures, and the architecture is usually related to the specific shapes in which the blocks are partitioned. For example, for a 2D block of size $(k_h, k_w)$, blocks may be processed for each channel one after another, and the set of recovered blocks $\overline{B}_1^{i-1}$ may contain blocks from both previous channels and the current channel, and accordingly the Prediction DNN may include modules to exploit both within channel spatial relation and cross-channel relation. Accordingly, this disclosure does not put any restrictions on the specific network structures for the Prediction DNN.

The Context DNN computes the context parameters $z_b$ that is used by the AD module 312 and IQ module 313 to compute the recovered block $\bar{b}_i$ based on the encoded compact representation $b_i'$. In a preferred embodiment, the context parameters $z_b$ are a set of parameters that compute the probability density of the partitioned latent block $b_i$ by a density estimation method. Similarly, the Residual Context DNN computes the residual context parameters $z_r$ that is used by the Residual AD module 310 and Residual IQ module 311 to compute the recovered residual $\bar{r}_i$ based on the encoded compact residual representation $r_i'$. In a preferred embodiment, the residual context parameters $z_r$ are a set of parameters that compute the probability density of the latent residual $\hat{r}_i$ by a density estimation method. This disclosure does not put any restrictions on the specific density estimation methods, the distribution formats of the latent blocks or latent residuals, or the network structures of the Context DNN and the Residual Context DNN.

The Block Selection module generates the selection signal $s_i$ by computing the loss of either using the compact residual representation $r_i'$ or the compact representation $b_i'$ for encoding the current partitioned latent block $b_i$, and selects the one with less loss. In the preferred embodiment, a R-D loss is used to take into account both distortion and bit rate:

$$L(r_i')=\rho_r D(b_i,\bar{b}_i|r_i')+R(r_i') \quad (1)$$

$$L(b_i')=\rho_b D(b_i,\bar{b}_i|b_i')+R(b_i') \quad (2)$$

Wherein $D(b_i, \bar{b}_i|r_i')$ and $D(b_i, \bar{b}_i|b_i')$ measure the distortion (e.g., the MSE or SSIM) between the partitioned latent block $b_i$ and the recovered block $\bar{b}_i$ based on the encoded compact residual representation $r_i'$ and the compact representation $b_i'$, respectively. $R(r_i')$ and $R(b_i')$ compute the bit rate of the compact residual representation $r_i'$ and the compact representation $b_i'$, respectively. $\rho_r$ and $\rho_b$ are tradeoff hyperparameters.

Figure 5:
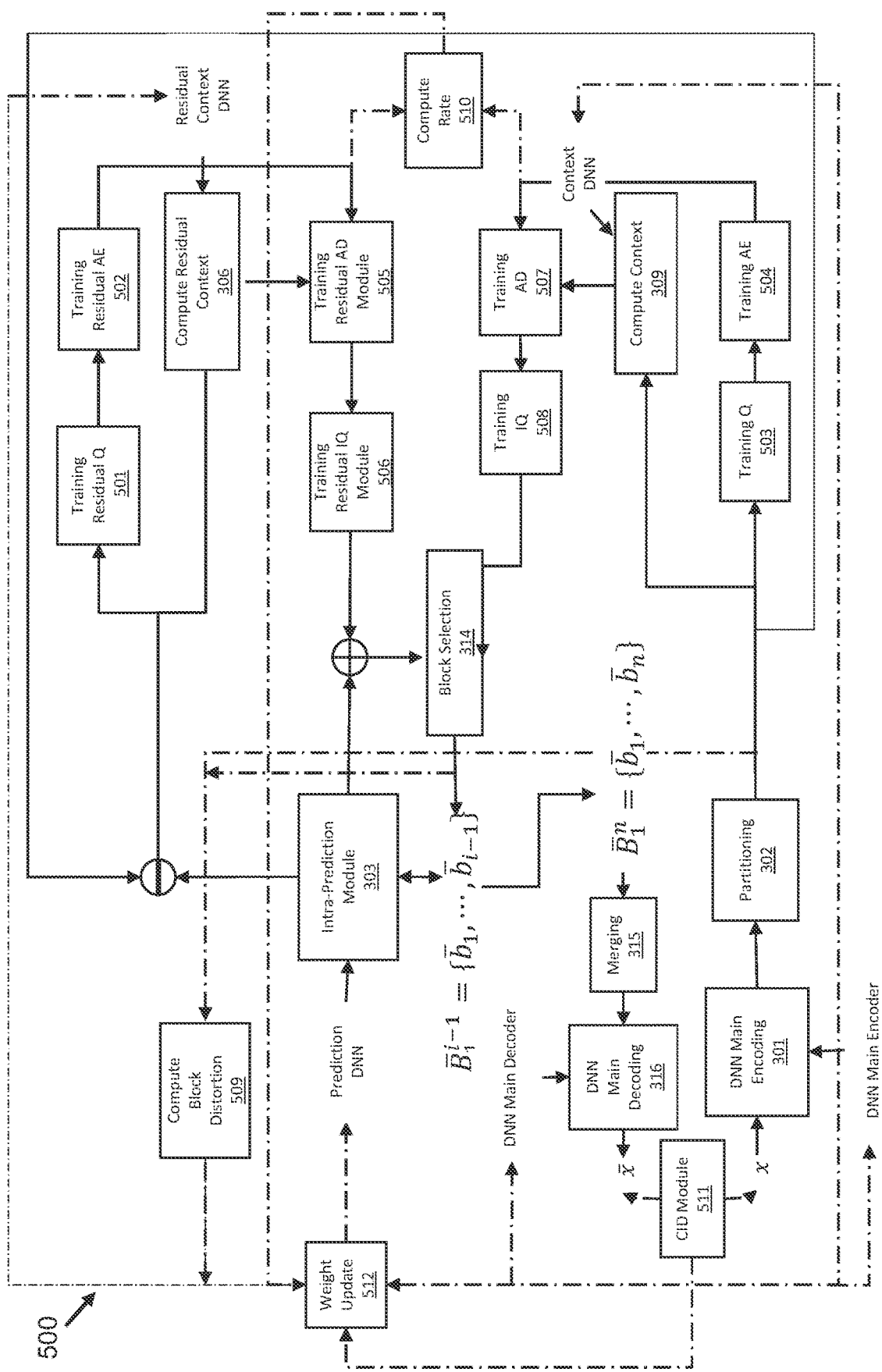
FIG. 5 is a block diagram of a training apparatus for neural image compression with intra-prediction in the latent feature-domain, during a training stage, according to embodiments.

The training process of the various DNNs in embodiments will be described. The target of the training process is to learn the DNN Main Encoder, the DNN Main Decoder, the Prediction DNN, the Context DNN, and the Residual Context DNN. FIG. 5 is a block diagram of a training apparatus 500 for neural image compression with latent feature-domain block-based intra-prediction and residual coding, during a training stage, according to embodiments.

As shown in FIG. 5, the training apparatus 500 includes the DNN Main Encoding module 301, the Partitioning module 302, the Intra-Prediction module 303, a Training Residual Q module 501, a Training Residual AE module 502, the Compute Residual Context module 306, a Training Q module 503, a Training AE module 504, the Compute Context module 309, a Training Residual AD module 505, a Training Residual IQ module 506, a Training AD module 507, a Training IQ module 508, the Block Selection module 314, a Compute Block Distortion module 509, a Compute Rate module 510, the Merging module 315, the DNN Main Decoding module 316, a Compute Input Distortion module 511, and a Weight Update module 512.

For training, first the weight coefficients of the above DNNs to be learned are initialized, for example, by using pre-trained corresponding DNN models or by setting them to random numbers. Then, given an input training image x, similar to the test stage, the DNN Main Encoding module 301 computes a latent representation y by using the current DNN Main Encoder. The latent representation y is passed through the Partitioning module 302 and partitioned into n blocks $B_1^n = \{b_1, \ldots, b_n\}$, each partitioned latent block $b_i$ having size $(k_h, k_w, k_c)$. Using the set of previously recovered blocks $\bar{B}_1^{i-1} = \{\bar{b}_1, \ldots, \bar{b}_{i-1}\}$, the Intra-Prediction module 303 computes the predicted block $\hat{b}_i$ by using the current Prediction DNN. The prediction residual $\hat{r}_i$ is then computed based on the difference between predicted block $\hat{b}_i$ and the partitioned latent block $b_i$. This prediction residual $\hat{r}_i$ is passed through a Training Residual Q module 501, followed by a Training Residual AE module 502 to generate the compact residual representation $r_i'$. At the same time, the Compute Residual Context module 306 computes the set of residual context parameters $z_r$ based on the prediction residual $\hat{r}_i$, by using the current Residual Context DNN.

On the other hand, the partitioned latent block $b_i$ of the latent representation y is passed through a Training Q module 503 followed by a Training AE module 504 to generate the compact representation $b_i'$. At the same time, the Compute Context module 309 computes the set of context parameters $z_b$ based on the partitioned latent block $b_i$, by using the current Context DNN.

Using the compact residual representation $r_i'$ and the residual context parameters $z_r$, a Training Residual AD module 505 followed by a Training Residual IQ module 506 compute the decoded residual $\bar{r}_i$, which is added back to the predicted block $\hat{b}_i$ to obtain the decoded block $\bar{b}_{ri}$. Also, using the compact representation $b_i'$ and the context parameters $z_b$, a Training AD module 507 followed by a Training IQ module 508 compute the decoded block $\bar{b}_{bi}$. The Block Selection module 314 generates the selection signal $s_i$ indicating which decoded block, $\bar{b}_{ri}$ or $\bar{b}_{bi}$, is used as the current recovered block $\bar{b}_i$. This is done, for example, by setting the selection signal $s_i$ as binary 0 or 1. A block distortion loss $E(b_i, \bar{b}_i)$ is computed in a Compute Block Distortion module 509 to measure the distortion of the recovered latent block $\bar{b}_i$ compared with the original partitioned latent block $b_i$, such as the traditional MSE, MS-SSIM, or a weighted combination of both. Also, a rate loss $R(s_i, r_i'/b_i')$ can be computed by a Compute Rate module 510 to measure the bit consumption of the compressed representations. When the selection signal $s_i$ uses the decoded block $\bar{b}_{ri}$, the compact residual representation $r_i'$ and the residual context parameters $z_r$ are used to compute the rate loss $R(s_i, r_i')$. When the decoded block $\bar{b}_{bi}$ is used, the compact representation $b_i'$ and the context parameters $z_b$ are used to compute the rate loss $R(s_i, b_i')$.

Then the current recovered block $\bar{b}_i$ is used to update the set of previously recovered blocks $\bar{B}^{i-1}$ into the set of currently recovered blocks $\bar{B}_1^i$, and the encoder continues to process the next block $b_{i+1}$. After all the blocks are recovered, the Merging module generates 315 the recovered latent representation $\bar{y}$ by combining all the recovered blocks. Then the DNN Main Decoding module 316 computes the reconstructed image $\bar{x}$ based on recovered latent representation $\bar{y}$ by using the current DNN Main Decoder. An input distortion loss $D(x, \bar{x})$ is then computed in the Compute Input Distortion module 511 (shown as CID module 511 in FIG. 5) to measure the final reconstruction quality, such as the traditional PSNR, MS-SSIM, or a weighted combination of both.

Given a trade-off hyperparameter $\lambda$ and a regularization hyperparameter $\beta$, a joint R-D loss can be computes as:

$$L(x,\bar{x},\hat{r}_1,\ldots,\hat{r}_N,\bar{y})=\lambda D(x,\hat{x})+R(s_i,r_i'/b_i')+\beta E(b_i,\bar{b}_i) \quad (3)$$

Training with a large trade-off hyperparameter $\lambda$ results in compression models with smaller distortion but more bit consumption, and vice versa. Training with a large regularization hyperparameter β places a large penalty on block-wise distortions as additional constraints. Then, the gradient of the joint R-D loss can be computed, which is used by back-propagating through the Update Weight module 512 to update the weight parameters of the DNN Main Encoder, the DNN Main Decoder, the Prediction DNN, the Context DNN, and the Residual Context DNN. Different DNNs can be updated at different times with different updating paces. Additionally, any of the DNNs can be learned individually. For example, the Prediction DNN, the Main DNN Encoder and Main DNN Decoder can be individually trained using some dataset (the same as or different from the dataset used in the above training process). The above mentioned training process can be fixed such that only the weight parameters of the remaining DNNs are updated. Part of the weight parameters in the above mentioned training process can also be fine-tuned.

In the preferred embodiment, the Training Residual Q module 501, Training Residual AE module 502, Training Residual AD module 505, and Training Residual IQ module 506 are different from their corresponding modules in the test stage. For example, for training, the Training Residual Q module 501, the Training Residual AE module 502, the Training Residual AD module 505 and the Training Residual IQ module 506 can be one statistic data sampler to approximate the actual encoding-decoding effect of the Residual Q module 304, the Residual AE module 305, the Residual AD module 310 and the Residual IQ module 311. Similarly, the Training Q module 503, Training AE module 504, Training AD module 507, and Training IQ module 508 are different from their corresponding modules in the test stage. For example, for training, the Training Q module 503, the Training AE module 504, the Training AD module 507 and the Training IQ module 508 can be one statistic data sampler to approximate the actual encoding-decoding effect of the Q module 307, the AE module 308, the AD module 312 and the IQ module 313.

Figure 6:
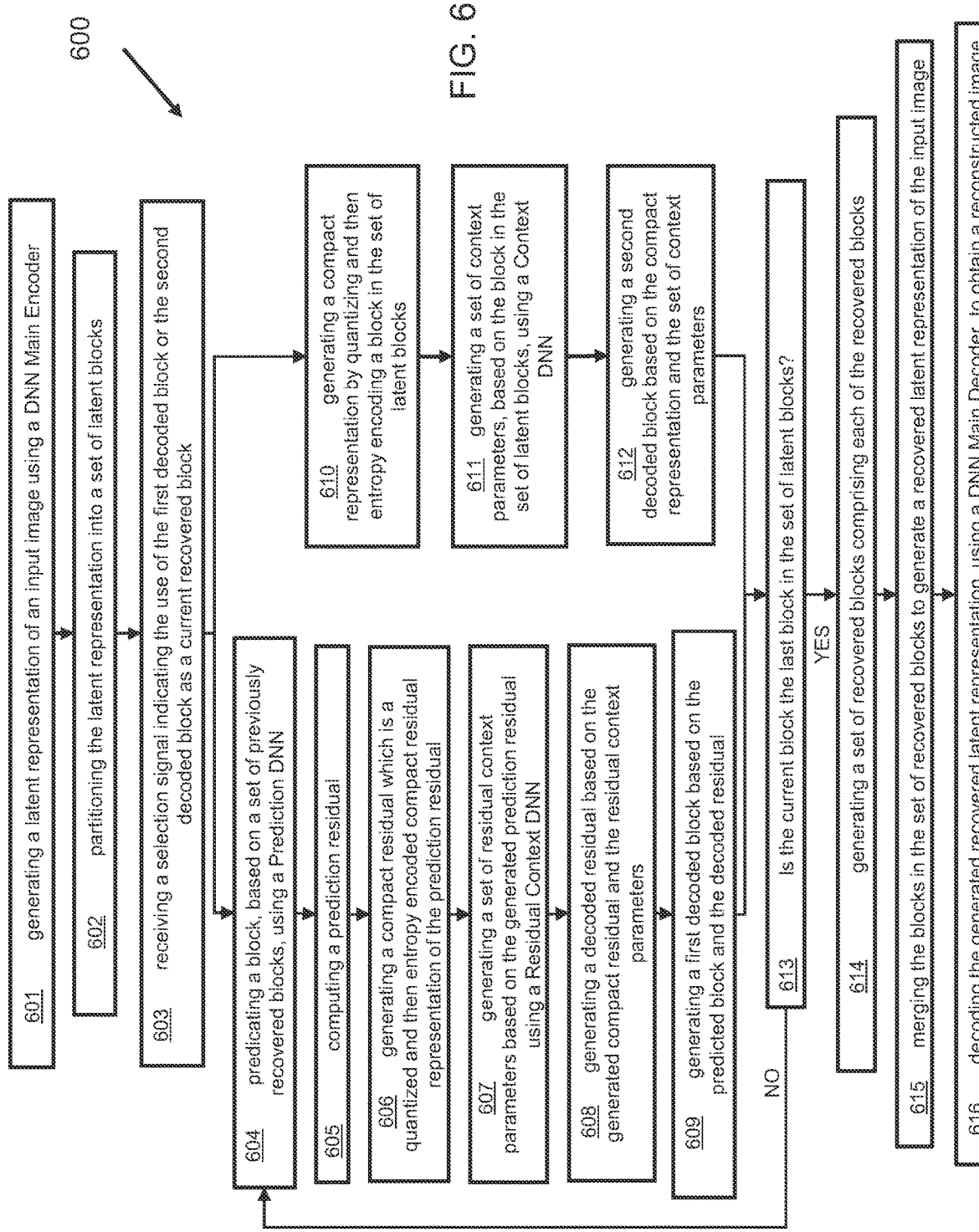
FIG. 6 is a flowchart of a method of neural image compression with intra-prediction in the latent feature-domain, according to embodiments.

FIG. 6 is a flowchart of a method 600 of neural image compression with intra-prediction in the latent feature-domain, according to embodiments.

In some implementations, one or more process blocks of FIG. 6 may be performed by the platform 120. In some implementations, one or more process blocks of FIG. 6 may be performed by another device or a group of devices separate from or including the platform 120, such as the user device 110. Although FIG. 6 shows example blocks of the method, in some implementations, the method may include additional blocks, fewer blocks, different blocks, or differently arranged blocks than those depicted in FIG. 6. Additionally, or alternatively, two or more of the blocks of the method may be performed in parallel.

As shown in FIG. 6, in operation 601, the method 600 includes generating a latent representation of an input image using a DNN Main Encoder.

In operation 602, the method of FIG. 6 includes partitioning the latent representation into a set of latent blocks.

In operation 603, the method of FIG. 6 includes receiving a selection signal indicating the use of a first decoded block or a second decoded block as a current recovered block.

Following operation 603, the method continues to operations 604-609 and operations 610-612. In FIG. 6, operation blocks 604-609 and operations blocks 610-612 appear to be performed in parallel. However, operation blocks 604-609 may be performed before or after operation blocks 610-612. This disclosure is not limited to the above mentioned ordering of operation blocks.

In operation 604, the method of FIG. 6 includes predicating a block, based on a set of previously recovered blocks, using a Prediction DNN.

In operation 605, the method of FIG. 6 includes computing a prediction residual.

In operation 606, the method of FIG. 6 includes generating a compact residual which is a quantized and then entropy encoded compact residual representation of the prediction residual.

In operation 607, the method of FIG. 6 includes generating a set of residual context parameters based on the generated prediction residual using a Residual Context DNN.

In operation 608, the method of FIG. 6 includes decoding and then using a dequantization method to generate a decoded residual based on the generated compact residual and the residual context parameters.

In operation 609, the method of FIG. 6 includes generating the first decoded block based on the predicted block 604 and the decoded residual from operation 608.

In operation 610, the method of FIG. 6 includes generating a compact representation by quantizing and then entropy encoding a block in the set of latent blocks partitioned in operation 602.

In operation 611, the method of FIG. 6 includes generating a set of context parameters, based on the block in the set of latent blocks partitioned in operation 602, using a Context DNN.

In operation 612, the method of FIG. 6 includes generating the second decoded block based on the compact representation from operation 610 and the set of context parameters from operation 610.

In operation 613, the method of FIG. 6 determines if the current block is the last block in the set of latent blocks partitioned in operation 602. If yes, the last block is processed, the method proceeds to operation 614. If no, the method repeats operations 604-612 for the next block in the set of latent blocks partitioned in operation 602.

In operation 614, the method of FIG. 6 includes generating a set of recovered blocks comprising each of the recovered blocks output from operations 604-612.

In operation 615, the method of FIG. 6 includes merging the blocks in the set of recovered blocks to generate a recovered latent representation of the input image.

In operation 616, the method of FIG. 6 includes decoding the generated recovered latent representation, using a DNN Main Decoder, to obtain a reconstructed image.

Figure 7:
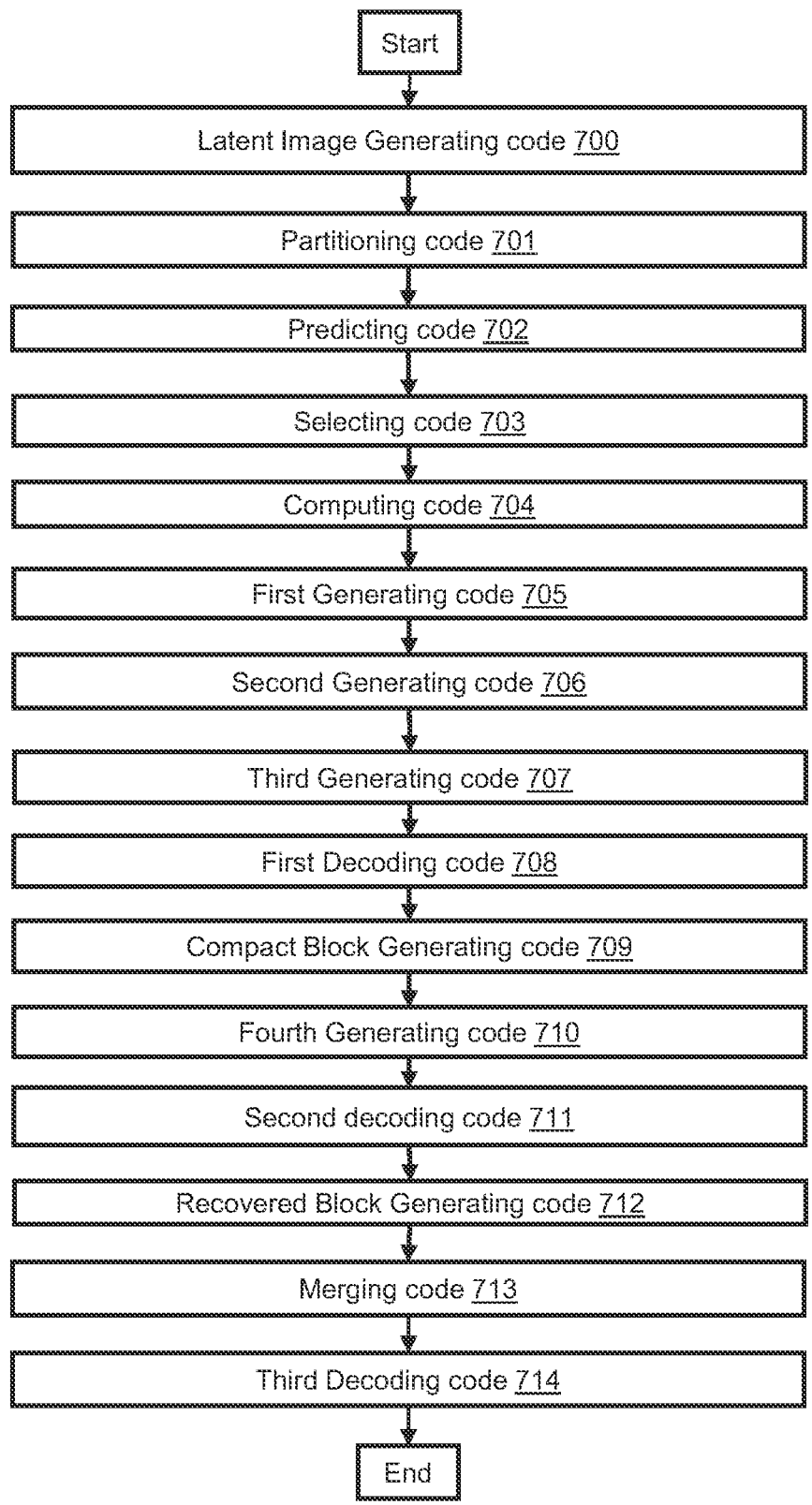
FIG. 7 is a block diagram of an apparatus of neural image compression with intra-prediction in the latent feature-domain, according to embodiments.

FIG. 7 is a block diagram of an apparatus of neural image compression with intra-prediction in the latent feature-domain, according to embodiments.

As shown in FIG. 7, the apparatus includes latent image generating code 700, partitioning code 701, predicting code 702, selecting code 703, computing code 704, first generating code 705, second generating code 706, third generating code 707, first decoding code 708, compact block generating code 709, fourth generating code 710, second decoding code 711, recovered block generating code 712, merging code 713, and third decoding code 714.

The latent image generating code 700 is configured to cause at least one processor to generate a latent representation of an input image using a DNN Main Encoder.

The partitioning code 701 is configured to cause at least one processor to partition the latent representation into a set of latent blocks.

The predicting code 702 is configured to cause at least one processor to predict a block, based on a set of previously recovered blocks, using a Prediction DNN.

The selecting code 703 is configured to cause at least one processor to receive a selection signal indicating the use of a first decoded block or a second decoded block as a current recovered block.

The computing code 704 is configured to cause at least one processor to compute a prediction residual.

The first generating code 705 is configured to cause at least one processor to generate a compact residual which is a quantized and then entropy encoded compact residual representation of the prediction residual.

The second generating code 706 is configured to cause at least one processor to generate a set of residual context parameters based on the computed prediction residual using a Residual Context DNN.

The third generating code 707 is configured to cause at least one processor to decode and then use a dequantization method to generate a decoded residual, based on the generated compact residual and the residual context parameters.

The first decoding code 708 is configured to cause at least one processor to generate the first decoded block based on the predicted block and the decoded residual.

The compact block generating code 709 is configured to cause at least one processor to generate a compact representation by quantizing and then entropy encoding a block in the set of latent blocks.

The fourth generating code 710 is configured to cause at least one processor to generate a set of context parameters based on the block in the set of latent blocks using a Context DNN.

The second decoding code 711 is configured to cause at least one processor to generate the second decoded block based on the compact representation and the set of context parameters.

The recovered block generating code 712 is configured to cause at least one processor to generate a set of recovered blocks comprising each of the recovered blocks.

The merging code 713 is configured to cause at least one processor to merge the blocks in the set of recovered blocks to generate a recovered latent representation of the input image.

The third decoding code 714 is configured to cause at least one processor to generate a recovered latent representation, using a DNN Main Decoder, to obtain a reconstructed image.

Although FIG. 7 shows example blocks of the apparatus, in some implementations, the apparatus may include additional blocks, fewer blocks, different blocks, or differently arranged blocks than those depicted in FIG. 7. Additionally, or alternatively, two or more of the blocks of the apparatus may be combined.

Embodiments describe the idea of exploiting two mechanisms to improve NIC coding efficiency: encoding residuals between prediction blocks and the original blocks instead of encoding the original blocks; and conducting prediction in the latent feature domain to conveniently incorporate both spatial and cross-channel information for effective prediction and reconstruction. This method of NIC coding advantageously results in a flexible and general framework that accommodates different intra-prediction methods, different neural encoding methods, and various types of quality metrics.

The proposed NIC coding methods may be used separately or combined in any order. Further, each of the methods (or embodiments), encoder, and decoder may be implemented by processing circuitry (e.g., one or more processors or one or more integrated circuits). In one example, the one or more processors execute a program that is stored in a non-transitory computer-readable medium.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein may be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method of decoding a neural image with latent feature-domain intra-prediction, the method being performed by at least one processor, and the method comprising:
    receiving a set of latent blocks, and for each of the blocks in the set of latent blocks:
    predicting a block, based on a set of previously recovered blocks, using a first neural network;
    receiving a selection signal indicating a currently recovered block;
    based on the received selection signal, performing one of (1) and (2):
        (1) generating a compact residual, a set of residual context parameters, and a decoded residual; and
            generating a first decoded block, based on the predicted block and the decoded residual;
        (2) generating a second decoded block, based on a compact representation block and a set of context parameters;
    generating a set of recovered blocks comprising each of the currently recovered blocks;

generating a recovered latent image by merging all the blocks in the set of recovered blocks; and decoding the generated recovered latent image, using a second neural network, to obtain a reconstructed image.

2. The method of claim 1, further comprising:

generating a latent representation of an input image using a third neural network; and partitioning the latent representation into the set of latent blocks.

3. The method of claim 1, further comprising:

generating the compact residual by quantizing and then entropy encoding a prediction residual;

generating the set of residual context parameters, based on a prediction residual, using a fourth neural network; and generating the decoded residual by decoding and then dequantizing the compact residual and the residual context parameters, wherein the compact residual and the set of residual context parameters are generated simultaneously.

4. The method of claim 3, further comprising:

generating the compact representation block by quantizing and then entropy encoding a current latent block from the set of latent blocks; and generating the set of context parameters, based on the current latent block, using a fifth neural network, wherein the set of context parameters and the compact representation are generated simultaneously.

5. The method of claim 4, wherein the prediction residual is the difference between the predicated block and the current latent block from the set of latent blocks.

6. The method of claim 1, wherein the set of recovered blocks is used to update the set of previously recovered blocks.

7. The method of claim 1, further comprising:

the selection signal selecting at least one of the first decoded block and the second decoded block as the currently recovered block;

sending, when the first decoded block is selected, the compact residual, the set of residual context parameters, and the selection signal to a decoder as inputs; and sending, when the second decoded block is selected, the compact representation, the set of context parameters, and the selection signal to the decoder as inputs.

8. An apparatus for neural image compression with latent feature-domain intra-prediction, the apparatus comprising:

at least one memory configured to store program code; and at least one processor configured to read the program code and operate as instructed by the program code, the program code comprising:

receiving code configured to cause the at least one processor to receive a set of latent blocks;

prediction code configured to cause the at least one processor to predict a block, based on a set of previously recovered blocks, using a second neural network;

selecting code configured to cause the at least one processor to receive a selection signal indicating a currently recovered block for each of the blocks in the set of latent blocks, based on the received selection signal, perform one of (1) and (2):

(1) first generating code configured to cause the at least one processor to generate a compact residual;

second generating code configured to cause the at least one processor to generate a set of residual context parameters;

third generating code configured to cause the at least one processor to generate a decoded residual; and first decoding code configured to cause the at least one processor to generate a first decoded block, based on the predicted block and the decoded residual;

(2) second decoding code configured to cause the at least one processor to generate a second decoded block, based on a compact representation block and a set of context parameters;

recovered block generating code configured to cause the at least one processor to generate a set of recovered blocks comprising each of the currently recovered blocks;

merging code configured to cause the at least one processor to merge all the blocks in the set of recovered blocks to generate a recovered latent image; and third decoding code configured to cause the at least one processor to decode the generated recovered latent image, using a second neural network, to obtain a reconstructed image.

9. The apparatus of claim 8, further comprising:

latent image generating code configured to cause the at least one processor to generate a latent representation of an input image using a third neural network; and partitioning code configured to cause the at least one processor to partition the latent representation of the input image into the set of latent blocks.

10. The apparatus of claim 8, wherein the program code further comprises:

first generating code configured to cause the at least one processor to generate the compact residual by quantizing and then entropy encoding a prediction residual;

second generating code configured to cause the at least one processor to generate the set of residual context parameters, based on the prediction residual, using a fourth neural network; and third generating code configured to cause the at least one processor to generate the decoded residual by decoding and then dequantizing the compact residual and the residual context parameters, wherein the compact residual and the set of residual context parameters are generated simultaneously.

11. The apparatus of claim 10, wherein the program code further comprises:

compact block generating code configured to cause the at least one processor to generate the compact representation block by quantizing and then entropy encoding a current latent block from the set of latent blocks; and fourth generating code configured to cause the at least one processor to generate the set of context parameters, based on the current latent block, using a fifth neural network, wherein the set of context parameters and the compact representation are generated simultaneously.

12. The apparatus of claim 11, wherein the program code further comprises computing code configured to cause the at least one processor to compute the difference between the predicated block and the current latent block from the set of latent blocks as the prediction residual.

13. The apparatus of claim 8, wherein the program code further comprises updating code configured to cause the at least one processor to update the set of previously recovered blocks using the set of recovered blocks.

14. The apparatus of claim 8, wherein the selecting code is further configured to cause the at least one processor to:

select at least one of the first decoded block and the second decoded block as the currently recovered block;

send the compact residual, the set of residual context parameters and the selection signal to the third decoding code when the first decoded block is selected; and send the compact representation, the set of context parameters and the selection signal to the third decoding code when the second decoded block is selected.

15. A non-transitory computer-readable medium storing instructions that, when executed by at least one processor neural image compression with latent feature-domain intra-prediction, cause the at least one processor to:

receive a set of latent blocks;

predict a block, based on a set of previously recovered blocks, using a second neural network;

receive a selection signal indicating a currently recovered block for each of the blocks in the set of latent blocks, based on the received selection signal, perform one of (1) and (2):

(1) generate a compact residual, a set of residual context parameters, and a decoded residual; and generate a first decoded block based on the predicted block and the decoded residual;

(2) a second decoded block, based on a compact representation block and a set of context parameters;

generate a set of recovered blocks comprising each of the currently recovered blocks;

merge all the blocks in the set of recovered blocks to generate a recovered latent image; and decode the generated recovered latent image, using a second neural network, to obtain a reconstructed image.

16. The non-transitory computer-readable medium of claim 15, wherein the instructions, when executed by the at least one processor, further causes the at least one processor to:

generate a latent representation of an input image using a third neural network; and partition the latent representation of the input image into the set of latent blocks.

17. The non-transitory computer-readable medium of claim 15, wherein the instructions, when executed by the at least one processor, further causes the at least one processor to:

generate the compact residual by quantizing and then entropy encoding a prediction residual;

generate the set of residual context parameters, based on the prediction residual, using a fourth neural network; and generate the decoded residual by decoding and then dequantizing the compact residual and the residual context parameters, wherein the compact residual and the set of residual context parameters are generated simultaneously.

18. The non-transitory computer-readable medium of claim 17, wherein the instructions, when executed by the at least one processor, further causes the at least one processor to:

generate the compact representation block by quantizing and then entropy encoding a current latent block from the set of latent blocks; and generate the set of context parameters, based on the current latent block, using a fifth neural network, wherein the set of context parameters and the compact representation are generated simultaneously.

19. The non-transitory computer-readable medium of claim 17, wherein the instructions, when executed by the at least one processor, further causes the at least one processor to update the set of previously recovered blocks using the set of recovered blocks.

20. The non-transitory computer-readable medium of claim 17, wherein the instructions, when executed by the at least one processor, further causes the at least one processor to:

select at least one of the first decoded block and the second decoded block as the currently recovered block;

send the compact residual, the set of residual context parameters and the selection signal to the third decoding code when the first decoded block is selected; and send the compact representation, the set of context parameters and the selection signal to the third decoding code when the second decoded block is selected.

* * * * *